Nov. 28, 1961   M. R. GLASSON   3,010,187
METHOD OF MAKING DOUBLE BLADED BLOWER WHEEL
Filed March 10, 1958   2 Sheets-Sheet 1
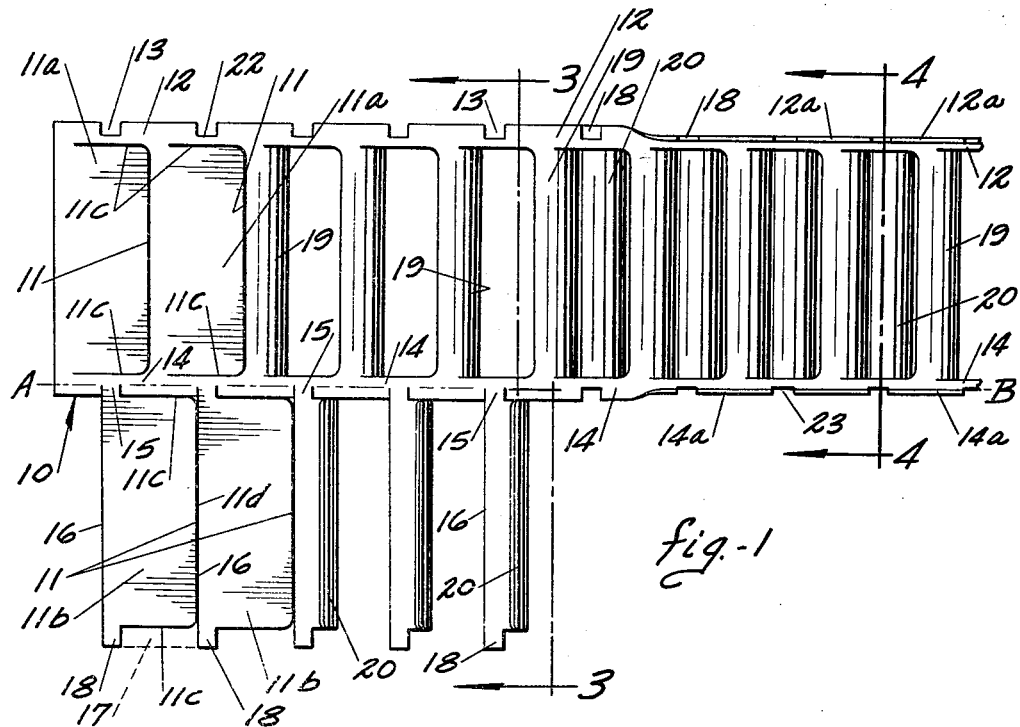
fig.-1
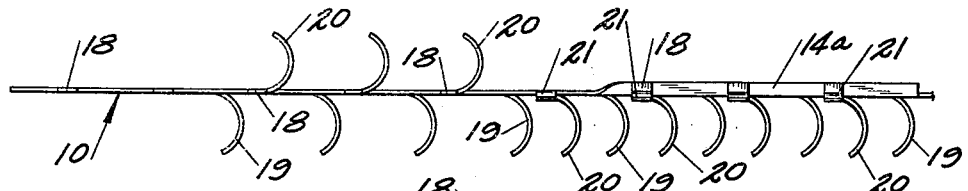
fig.-2
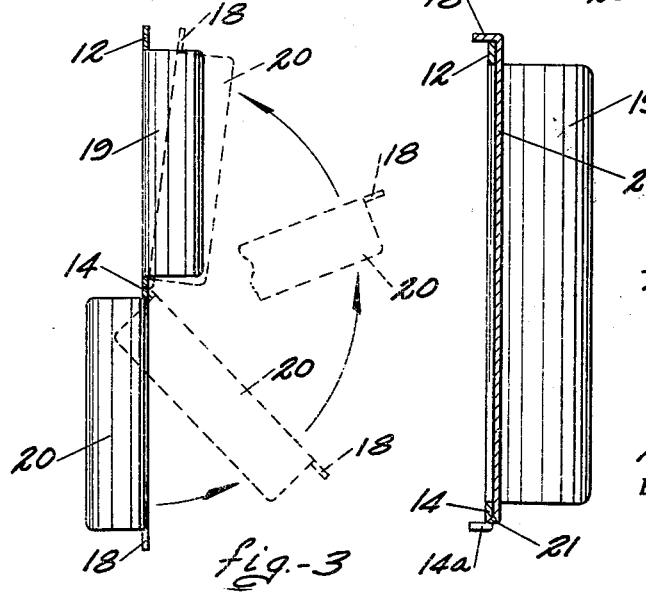
fig.-3
fig.-4
INVENTOR.
MARVIN R. GLASSON
BY Herbert A. Minturn
ATTORNEY

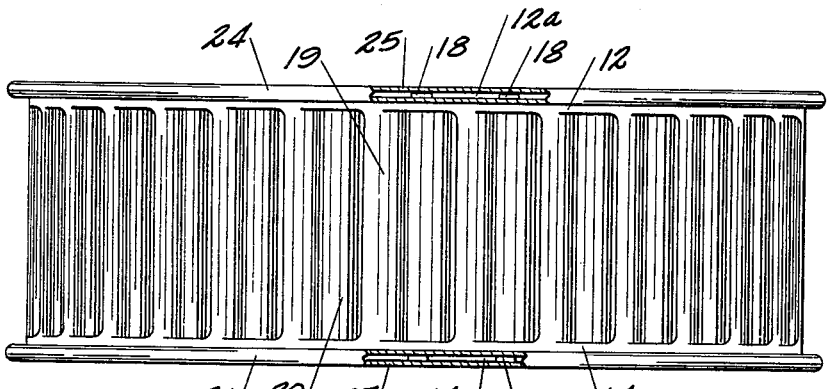
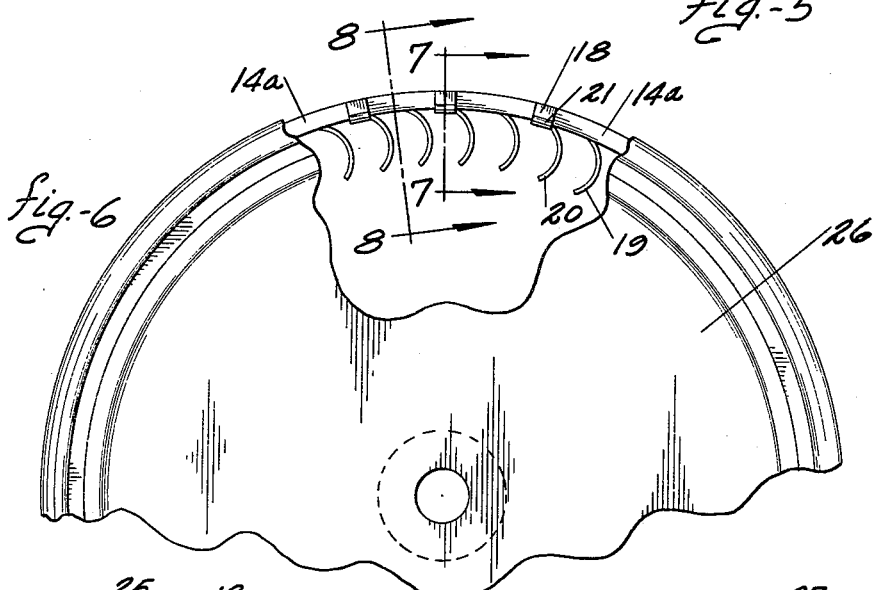
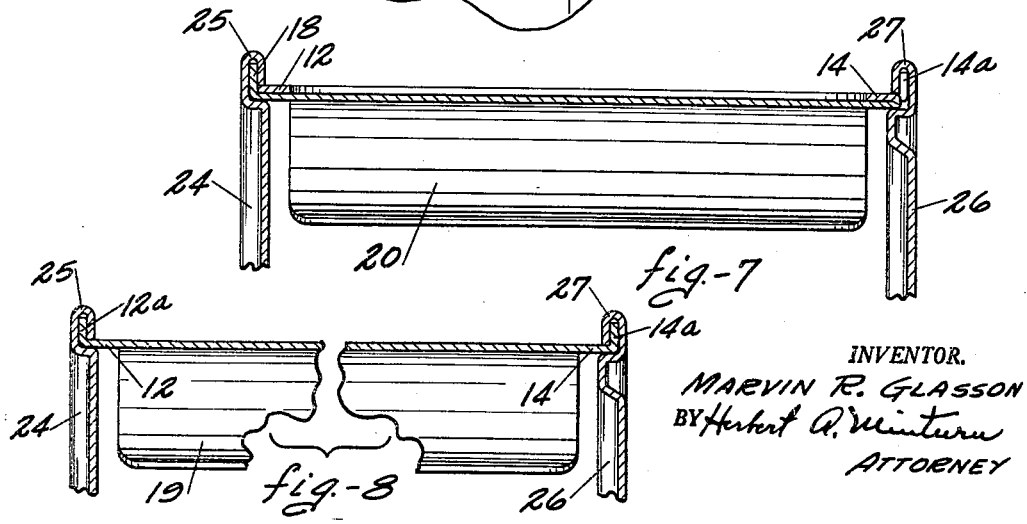
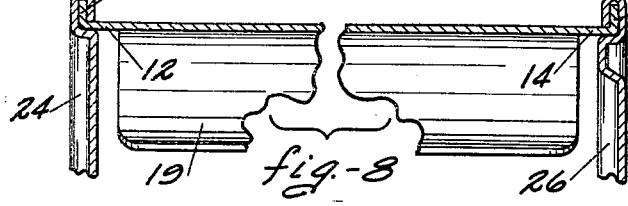

United States Patent Office 3,010,187
Patented Nov. 28, 1961

3,010,187
METHOD OF MAKING DOUBLE BLADED BLOWER WHEEL
Marvin R. Glasson, Columbus, Ind., assignor to Vernco Corporation, Columbus, Ind., a corporation of Indiana
Filed Mar. 10, 1958, Ser. No. 720,268
2 Claims. (Cl. 29—156.8)

This invention relates to a method of a blower wheel having an apertured peripheral band from which blades are cut and extend inwardly with the blades in general parallelism with the axis of rotation of the wheel.

One of the immediate problems in designing and manufacturing a blower wheel is to be able to increase a volume of air output while holding the axial length of the wheel and also the diameter of the wheel constant. In many installations, such as in automotive usage, space within which a blower wheel may be placed is extremely limited, and yet a high rate of air flow is required, this requirement becoming increasingly greater from year to year.

Cross sectional curvature of the blades has about reached its greatest possibility for highest efficiency in promoting air flow. Therefore the only known method of increasing the flow of air is to increase the number of blades presented around the wheel, taking care at the same time that the blades are not too closely spaced one from the other as to interfere with air flow therebetween.

The present invention has to do with increasing the number of blades about the periphery of the wheel, and by the method herein disclosed, a rigid blower wheel is secured and a simplified method of forming it is also had.

This is accomplished in a rather unique manner as will now be described in connection with the drawings, in which FIG. 1 is a view of a metal strip showing the progressive stages in forming the circumferential band of the wheel;

FIG. 2 is a view in end elevation;

FIG. 3 is a view in section on the line 3—3 in FIG. 1;

FIG. 4 is a view in section on an enlarged scale on the line 4—4 in FIG. 1;

FIG. 5 is a view in side elevation and partial section of a wheel embodying the invention;

FIG. 6 is a view in end elevation from a back plate side of the wheel with a portion of the back plate removed;

FIG. 7 is a view in section on the line 7—7 in FIG. 6; and

FIG. 8 is a view in section on the line 8—8 in FIG. 6.

A strip of metal sufficiently long to equal at least the circumferential length of a wheel to be constructed is progressively formed as indicated in FIG. 1, wherein the strip generally designated by the numeral 10 is initially slitted to one side of the longitudinal center line thereof on lines 11 defining blade blanks 11a. In like manner, the strip 10 on the other side of the center line designated by the line A—B is slitted on like lines 11 to form blade blanks 11b.

There is a distinction however in blanking out the strip 10 on each side of the center line A—B in that on the one side where the blanks 11a are defined, there is left a land 12 entirely therealong, with rectangular notches 13 punched out and centered on the lines 11c which constitute the ends of the blanks 11a. Then on the other side of the line A—B, the blade blanks 11b are staggered in relation to the blanks 11a on the other side, the line 11d being centered on the lines 11c of the blanks 11a. Further, the blanks 11b are united to the center land 14 by tongues 15 extending into the land 14 substantially halfway thereacross, one edge of the tongue 15 being in a continuous line with the heel 16 of the blank 11b. The blanks 11b are entirely severed, one blank adjacent the other across the heel line 16 in each instance. Ends of the lines 11c of the blanks 11b are cut to remove a generally rectangular section 17 between a tongue 18 extending therefrom, one edge of which is a continuation of the heel line 16 in each instance. In other words, each blade 11b is freed from the center land 14 and hangs thereto only by the tongue 15, and is provided with a tongue 18 at the opposite end.

After the blade blanks 11a and 11b have been so defined, these blanks are respectively curved from the plane of the strip 10 into the full blade curvature, thus defining the blades 19 and 20, the blades 19 being on the one side of the center line A—B and the blades 20 on the other side.

The blades 19 and 20 thus being defined, the blades 20 are then folded at the inner ends of the tongues 15 substantially on the line A—B to carry the blades 20 around and centrally between adjacent blades 19. The tongue 15 in each instance is bent as at 21, FIG. 4, and flattened down onto the land 14. The free tongues 18 are aligned to come into the notches 13 entering the edge of the land 12.

The land 12 is turned at right angles outwardly beyond a line through the base lines 22 of the notches 13 as indicated at 12a. The land 14 is bent at right angles along the line A—B to form a flange 14a intermittently notched as at 23, FIG. 1, these notches appearing at the zones from which the tongues 15 have been carried. The tongues 18 are turned along with the turned land 12 in the plane of that turned portion 12a. It is to be noted that in the initial formation of the strip 10 as indicated in FIGS. 1 and 3, the blades 19 and 20 are relatively turned from the strip in opposite directions, for example, blade 19 is pushed downwardly whereas the blade 20 is pushed upwardly so that when the blade 20 is carried around through the 180 degrees travel, the two blades will be directed in the same direction.

The strip of the blades thus formed, now assuming the reduced width for blades 19 and 20 arranged one after the other and both confined between the lands 12 and 14, is curved around into its circumferential formation so that the flange 12a including the tongues 18 on the one side may be gripped by an outer ring 24 which has a peripheral portion 25 curved entirely around the flange 12a compressibly engaging it thereby. The opposite end of the blade assembly is secured around the peripheral margin in the present illustration of a back plate 26 which has an overturned peripheral portion 27, turning over the flange 14a, this being the right angled flange above indicated as being turned from the land 14.

Thus it is to be seen that by this peculiar method, the peripheral portion of the wheel has the number of blades normally punched from a strip doubled, this being possible by taking a double width strip and punching out blades to either side of the center line of the strip, and then turning the blades from one side to come centrally between the blades of the other side of the strip.

Therefore while I have herein shown my invention in the one particular form, it is obvious that structural changes may be employed, and differences in the method may also be employed all without departing from the spirit of the invention, and I therefore do not desire to be limited to that precise form and method, beyond the limitations which may be imposed by the following claims.

I claim:

1. The method of making a blower wheel with closely spaced blades out of a metal strip, which method comprises cutting two sets of blades from the sheet, one set on each side of a longitudinal central land between adjacent opposing ends of the blades in the two sets; the ends of one set of blades terminating to form an outer marginal land along those one set ends; the blades in both first and second sets being spaced apart longitudinally of the strip and left integrally connected through blade heel portions to at least one of said two lands; notching the outer edge of said outer land at zones each approximately on a transverse center line of the blades of the first set; cutting the said integral connection of the blades of the second set transversely of the center land to form tongues entering a distance into that land; cutting the blades of the second set each to have a tongue extending from the outer free ends thereof; folding the center land tongues over and against the center land portions between the tongues and the ends of the first set of blades, carrying the second set of blades between the blades of the first set, and positioning the second free end blade tongues across said second land notches; folding normally portions of the central land between the land connected second blade tongues; folding normally to the outer land the portions between said notches, and folding the second blade free end tongues within those notches along with said last portions; shaping the two lands into cylindrical bands with said normal portions on each land extending radially therefrom; and fixing encircling members around said radial portions to retain said cylindrical shape.

2. The method of claim 1, in which said second blade, center land connected tongues are bent over along the longitudinal center line of the center land, and said portions of the center land form individual flanges all within a common plane.

References Cited in the file of this patent

UNITED STATES PATENTS

| | | |
|---|---|---|
| 1,038,110 | Foss | Sept. 19, 1912 |
| 1,996,155 | Janette | Apr. 2, 1935 |
| 2,240,238 | Baker | Apr. 29, 1941 |
| 2,242,586 | Marbach | May 20, 1941 |
| 2,684,521 | Morrison | July 27, 1954 |
| 2,724,547 | Abbott et al. | Nov. 22, 1955 |
| 2,878,989 | Sprouse | Jan. 31, 1957 |
| 2,915,239 | Borkat | Dec. 1, 1959 |
| 2,925,953 | Keeley | Feb. 23, 1960 |
| 2,958,459 | Newton et al. | Nov. 1, 1960 |